(No Model.) 2 Sheets—Sheet 1.

E. B. BARKER.
PHOTOGRAPHIC SHUTTER.

No. 461,910. Patented Oct. 27, 1891.

WITNESSES:
Edward C. Rowland.
Charles H. Ryder

INVENTOR
Erastus B Barker
BY Phillips Abbott
ATTORNEY (No Model.) 2 Sheets—Sheet 2.
E. B. BARKER.
PHOTOGRAPHIC SHUTTER.
No. 461,910. Patented Oct. 27, 1891.
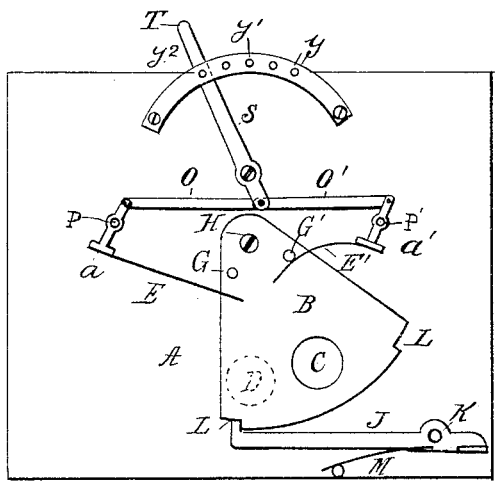
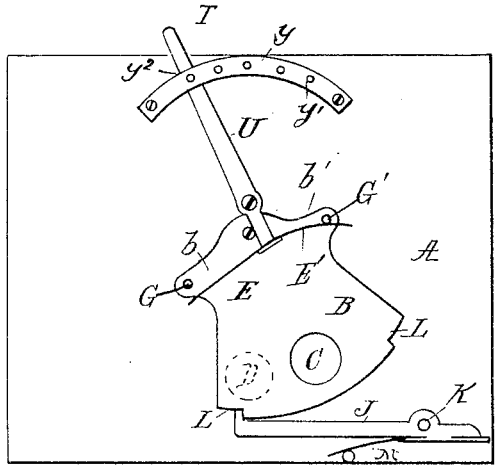
WITNESSES:
Edward C. Rowland
Charles Ryder
INVENTOR
Erastus B. Barker
BY Phillips Abbott
ATTORNEY

UNITED STATES PATENT OFFICE.

ERASTUS B. BARKER, OF NEWARK, NEW JERSEY, ASSIGNOR TO THE E. & H. T. ANTHONY & COMPANY, OF NEW YORK, N. Y.

PHOTOGRAPHIC SHUTTER.

SPECIFICATION forming part of Letters Patent No. 461,910, dated October 27, 1891.

Application filed December 26, 1890. Serial No. 375,781. (No model.)

*To all whom it may concern:*

Be it known that I, ERASTUS B. BARKER, a citizen of the United States, and a resident of Newark, in the county of Essex and State of New Jersey, have invented certain new and useful Improvements in Photographic Shutters, of which the following is a specification.

My invention relates to improvements in shutters for photographic cameras of the class in which the shutter does not require to be set after making an exposure by a reverse or return movement, but is "set," so to speak, at each end of its oscillating movements, so that an exposure may be made when it moves from right to left or from left to right; and my invention, more specifically stated, consists in springs each of which take a bearing upon the shutter and which are by suitable mechanism successively disconnected from it, so that they act upon it one at a time only; and my invention also extends to means whereby I am enabled to regulate the tension of the springs, thus determining the rapidity of the movements of the shutter.

Figure 1:
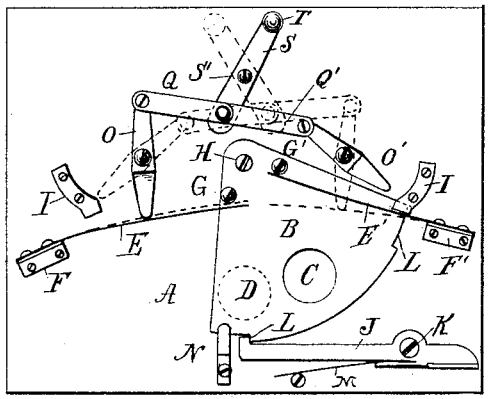
Figure 2:
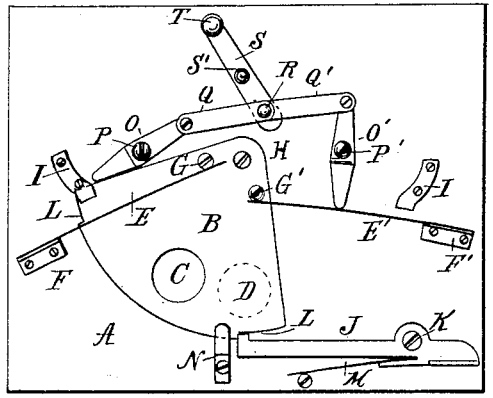
Figure 3:
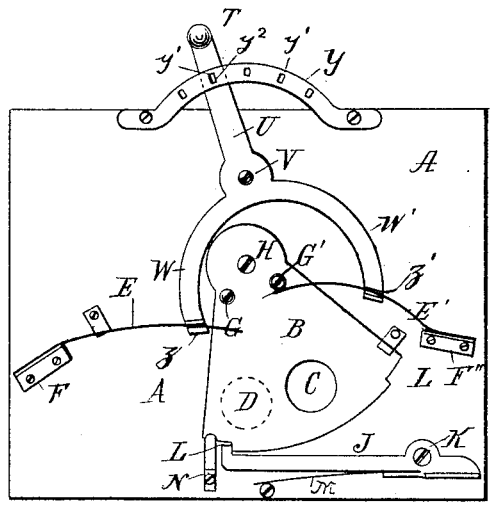

In the drawings, Figure 1 is an elevation showing in full lines the position of the parts after an exposure from left to right has been made and in dotted lines showing the position of the parts when in position for the second exposure from right to left. Fig. 2 is likewise an elevation showing the position of the parts after the exposure has been made from right to left. Fig. 3 shows an alternative construction in elevation, showing also means whereby I regulate the tension of the springs. Figs. 4 and 5 show simplified constructions of the device.

Referring first to Figs. 1 and 2, A is the base or board upon which the shutter mechanism is attached. It may be separated from the camera, so that the device can be bought and sold separately by itself; or it may form part of the camera, as desired. B is the shutter. C is the exposure-aperture in the shutter. D is the exposure-aperture in the board A or camera-front, as the case may be. E E' are two springs, (shown as flat or plate springs in this example;) but they may be of such other suitable construction, as preferred. They are attached at F F' to the board A or camera-front. G G' are two pins or other suitable projections or bearing-surfaces upon the shutter, against which the springs E and E' successively engage. H is a pivot upon which the shutter oscillates. I I are two stops beneath or against which the shutter is stopped at each extreme of its movement. J is a holding-lever catch or dog pivoted at K to the base-board A or camera-front, the end of which, as shown, engages in notches or detents L or their equivalents made upon the shutter. This catch or dog has a spring M, whereby it is normally held up against the shutter in such manner as properly to engage with it. N is a guide for the lower edge of the shutter. O O' are two arms pivoted at P P' to the base-board, and which are also pivoted, respectively, to links Q and Q', which are connected by the pivot R to a handle or lever S, which is pivoted at S' to the base-board A or to the camera-front, as the case may be, and on the ends of the lever or handle S there is a little thumb-piece or handle T.

The operation of the apparatus as above described is as follows: In Fig. 1 the device is shown as having made an exposure by the passage of the shutter from left to right, during which, of course, the aperture C in the shutter came coincident with the exposure-aperture D, whereby light was admitted to the camera through the lens in a well-known way and the picture was taken. This movement of the shutter was occasioned by the action of the spring E' taking a bearing against the pin G', the spring E being meantime held away from contact with the pin or projection G by the pressure of the lever O against it, and during this movement of the shutter from left to right the catch J of course had no control over the shutter. As soon, however, as it was stopped by the stop I at the right then the catch J came coincident with the left-hand detent L in the shutter and entered it, thus holding the shutter against return movement. To make now a second exposure, the lever S is thrown over from right to left, as shown in dotted lines, Fig. 1, which occasions the movement of the levers or arms O O' and the links Q Q', as shown in dotted lines. Thus pressure is removed from the spring E, but is applied to the spring E'. Therefore the spring E moves against the pin G and the spring E' is removed from any contact or action upon the shutter B. The catch J meantime holds the shutter in its position. (Seen in Fig. 1.) Upon pressing up the rear end of the catch J its other end is removed from the detent L at the left, Fig. 1. The spring E will then immediately throw the shutter over from right to left, and the lever J will then in turn enter the right-hand detent L, and the device will be held in that position, the same as before. The position of the parts after the second exposure has been made will be as shown in Fig. 2. This operation may be repeated indefinitely.

In Fig. 3 I show another construction of the parts, in which the spring-controlling lever is somewhat simplified in construction. U is the spring-controlling lever, pivoted at V to the base-board A. The lever has two arms W W' below the pivot and a single arm extending above, to the end of which I preferably attach the handle T. Y is a rack attached to the base-board A and having holes Y' Y' in it, within which catches a pin Y² on the lever U. This lever U is given a spring-pressure against the rack Y, so that the pin Y² upon it will be held in the holes Y' Y' by the resiliency of the lever. It is manifest that any other suitable device for holding the lever U in its right or left hand position or in a medial position for time exposures may be employed. The operation is obvious. It is substantially the same as that shown in Figs. 1 and 2. When the lever U is tipped to the left, as shown, then its end W depresses and controls the spring E, allowing the spring E' to act against the pin G' on the shutter. To make now the next exposure, the lever U is tipped over to the right, the pin Y² upon it entering one of the right-hand holes Y' in the rack Y, and then the end W' of the lever depresses and controls the spring E', the spring E being then free, and it exerts its power against the pin G to secure the swinging of the shutter from right to left.

In Fig. 3 I show also overlapping fingers or hooks Z and Z' on the ends of the arms W and W'. They, as shown, hook over the springs, respectively, so that not only are the springs successively removed from action upon the shutter, but also, by reason of the pull of the overlapping finger upon the other spring, which is allowed to act on the shutter, the tension of that one is increased by the flexure given to it by the pull of the finger, which engages with it. In this way, having a series of holes in the rack Y, the lever or arm U may be held by such one of them as will give the desired tension to the spring. Thus I am enabled to regulate the rapidity of the shutter movement and consequently the duration of the exposure.

In Figs. 4 and 5 I show two additional forms of my invention, in which the parts are simplified even beyond the form shown in Fig. 3. Referring to Fig. 4, the parts are substantially as set forth and shown in Figs. 1 and 2, excepting that the springs, instead of being attached to the base-board A or its equivalent, are fastened directly to the ends of the arms O and O', there being preferably small right-angle terminals $a\ a'$ formed on the ends of these arms, to which the springs may be soldered or riveted. It will be seen that as the arms O and O' are tipped upon their pivots P P' by the movement of the lever S the angle or direction of the springs will be changed relative to each other and that one of them will be caused to exert pressure and will be flexed against its appropriate pin G or G' on the shutter, and that the other spring will be carried away from its pin G or G'. Thus, as will be readily understood, the springs may be alternately caused to act upon and be disconnected from the shutter.

In Fig. 5 I show the simplest form of all, in which the springs are attached to the end of a single lever somewhat resembling the lever U in Fig. 3, and by its alternate movements to the right or left the springs E and E' are successively engaged with and disengaged from the pins G and G', and in this form of the invention it is desirable to extend the shutter laterally at its upper part, as at $b\ b'$, so that the pins G and G' or their equivalents may be placed in these extended parts, thus giving them the desirable offset from the pivot or axis of the shutter to afford the requisite length to the springs. The springs in this instance may be made all in one, the central part whereof will be riveted or soldered to the end of the lever U. Their ends, however, act independently of each other. Therefore they are mechanically two springs.

It will be observed that the rack Y, having holes Y', and the pin or stud Y² on the levers U and S (see Fig. 4) or some other holding means for these levers should be used when the device is constructed as shown in Figs. 4 and 5, so that the stress of the springs may be overcome, and I prefer to have a number of holes in the racks, so that the tension of the springs may be regulated.

Any suitable means may be used for operating the catch J, such as an electric, pneumatic, or spring motor or the hand of the operator or other device or means.

I do not limit myself to the details of construction shown and described, because they are not of the essence of my invention.

It is also obvious that my invention may be applied with suitable modifications in construction to rotary shutters and to sliding shutters, as well as to segmental or other form of pivoted shutters. I have shown the invention as applied to this last-named form simply because it well illustrates the invention, and that is a form of shutter quite popular at the present time.

I claim—

1. In shutter mechanism, the combination of a movable shutter, springs which take a bearing upon the shutter and are adapted to move it in different directions, and means connected with both of the springs, whereby they may be alternately removed from and brought in contact with the shutter, substantially as set forth.

2. In shutter mechanism, the combination of a movable shutter, springs adapted to move the shutter in different directions, and an oscillating lever which controls both of the springs, substantially as set forth.

3. In shutter mechanism, the combination of a movable shutter, two springs adapted to throw the shutter in different directions, and a latch which engages with and holds the shutter against the stress of the springs, substantially as set forth.

4. In shutter mechanism, the combination of a movable shutter, two springs which are constructed and arranged to take a bearing upon the shutter at their free ends, and a pivoted lever which controls the position of the springs, substantially as set forth.

5. A pivoted shutter for photographic cameras, having stops or detents for the engagement of a latch and stops for the engagement of springs therewith, one at the right and the other at the left of the axial line of the shutter, taken through the pivot, substantially as set forth.

6. In shutter mechanism, the combination of a shutter movable in different directions by different springs, a lever which is connected with the springs and which is constructed and arranged to alternately engage one and disengage the other from the shutter upon movement of said lever, substantially as set forth.

7. In shutter mechanism, the combination of a movable shutter, a lever, and springs which are made to alternately engage with the shutter by the movement of the lever, substantially as set forth.

Signed at New York, in the county of New York and State of New York, this 19th day of December, A. D. 1890.

ERASTUS B. BARKER.

Witnesses:
PHILLIPS ABBOTT,
CHARLES H. RYDER.